(12) United States Patent
Kline

(10) Patent No.: US 12,365,468 B2
(45) Date of Patent: *Jul. 22, 2025

(54) MATERIAL WITH METALLIC LAYER FOR INFLATABLE SAFETY DEVICE

(71) Applicant: Air Cruisers Company, LLC, Wall Township, NJ (US)

(72) Inventor: Dan Kline, Wall Township, NJ (US)

(73) Assignee: AIR CRUISERS COMPANY, LLC, Wall Township, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,859

(22) Filed: Dec. 22, 2022

(65) Prior Publication Data
US 2024/0208654 A1 Jun. 27, 2024

(51) Int. Cl.
*B64D 25/00* (2006.01)
*D06M 11/83* (2006.01)
*D06M 101/20* (2006.01)

(52) U.S. Cl.
CPC ............ *B64D 25/00* (2013.01); *D06M 11/83* (2013.01); *D06M 2101/20* (2013.01); *D10B 2321/0211* (2013.01); *D10B 2505/12* (2013.01)

(58) Field of Classification Search
CPC ............ Y10T 442/103; Y10T 442/109; Y10T 442/11; Y10T 442/152; Y10T 442/138; Y10T 442/188; Y10T 442/3049; Y10T 442/3382; Y10T 442/3398; Y10T 442/3333; Y10T 442/339; Y10T 442/3407; Y10T 442/3415; Y10T 442/3423; Y10T 442/419; Y10T 442/475; Y10T 442/481; Y10T 442/603; Y10T 442/654; Y10T 442/655; Y10T 442/656; Y10T 442/657; Y10T 442/658; Y10T 442/112; Y10T 442/2418; Y10T 442/2475; B32B 15/14; D10B 2321/0211; D10B 2505/12; D06M 11/83

See application file for complete search history.

(56) References Cited

U.S. PATENT DOCUMENTS 4,464,418 A * 8/1984 Pusch ................. E04F 13/0875
427/272
4,654,098 A * 3/1987 Miller .................... B64D 25/14
428/920

(Continued)

FOREIGN PATENT DOCUMENTS

CN 112810987 A 5/2021
WO 2022039814 A2 2/2022

OTHER PUBLICATIONS

Sterling Plastics, Technical Data Sheet for ultrahigh molecular weight polyethylene; copyright 2012 Sterling Plastics (Year: 2012).*

(Continued)

*Primary Examiner* — Jennifer A Steele
(74) *Attorney, Agent, or Firm* — Kilpatrick Townsend & Stockton LLP (57) ABSTRACT

Described are fabrics or flexible composite materials for an inflatable safety product. The fabrics or flexible composite materials may include a substrate and a metallic layer. The substrate may define a surface. The metallic layer may be completely covering or discontinuous, and the metallic layer may cover at least one surface of the substrate.

18 Claims, 5 Drawing Sheets

(56) References Cited

U.S. PATENT DOCUMENTS

| | | | |
|---|---|---|---|
| 8,168,283 B2 * | 5/2012 | Liggett | G09F 21/10 428/141 |
| 12,070,930 B2 * | 8/2024 | Swierkocki | B32B 15/088 |
| 12,122,128 B2 * | 10/2024 | Thomson | B32B 27/12 |
| 12,122,946 B2 * | 10/2024 | Swierkocki | C08J 5/121 |
| 12,129,038 B2 * | 10/2024 | Swierkocki | B64D 25/00 |
| 12,157,577 B2 * | 12/2024 | Duggal | D03D 15/527 |
| 12,163,067 B2 * | 12/2024 | Duggal | B29D 22/02 |
| 2003/0175545 A1 * | 9/2003 | Kastner | H05K 3/048 428/626 |
| 2007/0281570 A1 * | 12/2007 | Liggett | B32B 5/26 442/373 |
| 2012/0251801 A1 * | 10/2012 | Moore | B32B 27/20 156/60 |
| 2014/0134354 A1 * | 5/2014 | Mazany | D06N 3/0063 442/72 |
| 2017/0022658 A1 * | 1/2017 | Fang | D06N 3/0034 |
| 2024/0208656 A1 * | 6/2024 | Swierkocki | D06N 3/0063 |

OTHER PUBLICATIONS

Polyamide Data Sheet, polymerdatabase.com, downloaded 2023 (Year: 2023).*

Ultra-High-Molecular-Weight Polyethylene, Wikipedia, Available Online at: https://en.wikipedia.org/wiki/Ultra-high-molecular-weight_polyethylene, Nov. 2018, 9 pages.

International Application No. PCT/US2023/084678, International Search Report and the Written Opinion, mailed on Apr. 17, 2024, 9 pages.

* cited by examiner

MATERIAL WITH METALLIC LAYER FOR INFLATABLE SAFETY DEVICE

FIELD OF THE INVENTION

The field of the invention relates to gas-holding, air-holding, seam tape, patch, accessory, and component materials, and, more particularly, to fabrics or flexible composite materials for an inflatable safety product.

BACKGROUND

Federal aviation safety regulations require aircraft to provide evacuation and other safety provisions for passengers. These include evacuation slides, evacuation slide/rafts, ramps, slide/ramps, life rafts, life vests, helicopter floats and other life-saving inflatable devices. Relevant inflatable products that can be improved using the fabrics or flexible composite materials of the present disclosure can include evacuation slides, evacuation slides/rafts, evacuation ramps, evacuation slide/ramp, aviation life rafts, marine life rafts, emergency floats, emergency flotation systems, life preservers/vests, emergency flotation devices, inflatable shelters (military and nonmilitary), ship decoys and inflatable military targets, and any other flotation devices, rescue equipment, or other safety device requiring rapid inflation and/or secure air-holding functions or gas-holding functions. These inflatable devices are generally built from an assembly of inflatable tubular structures that form air beams that are sealed to one another. Inflatable escape slides and life rafts also have non-air-holding features, such as patches, floors, sliding surfaces, girts, handles, and other features.

Typically, in order to form the tubular structures, many pieces of fabric or flexible composite materials (which may be referred to herein as panels) are joined together. Safety regulations set strength requirements for the fabric or flexible composite materials itself (the field of the inflatable tube), as well as strength requirements for the seam areas. In certain embodiments, the tubular structures may be substantially leak proof when inflated to keep the inflation gas and air inside the tubes for long durations. The panels and/or the substrates can be heavy, which can make inflating safety provisions difficult and can increase the weight of a passenger vehicle on which the safety provisions are stored. Additionally, merely changing the substrate or panel material to reduce the weight may cause the safety provisions to no longer conform to various regulations, as discussed above.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a fabric or flexible composite material for an inflatable safety product includes a substrate defining a surface and a metallic layer covering at least one surface of the substrate.

According to certain embodiments of the present invention, a fabric or flexible composite material for an inflatable safety product includes a substrate defining a surface and a metallic layer covering at least one surface of the substrate. The substrate may include one or more of polyethylene, ultra-high molecular weight polyethylene, polypropylene, polyester, polyamide, aromatic polyamide, aramid, polyolefin, aromatic polyester, polyarylate, other liquid crystal polymers, or nylon.

According to certain embodiments of the present invention, a fabric or flexible composite material for an inflatable safety product includes a substrate defining a surface and a metallic layer on the surface of the fabric or flexible composite material. In various embodiments, the metallic layer is an outermost layer of the fabric or flexible composite material.

According to certain embodiments of the present invention, a fabric or flexible composite material for an inflatable safety product includes a substrate defining a surface and a completely covering metallic layer covering at least one surface of the substrate.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Inflatable safety products such as inflatable evacuation slides, slide/rafts, ramps, and slide/ramps traditionally utilize a fabric or flexible composite material with a polyamide substrate such as Nylon 6,6 and thermoplastic polyurethane coatings. The thermoplastic polyurethane coatings are applied to the polyamide substrate to provide abrasion resistance and gas barrier properties.

Polyamide substrates have a relatively high melting point (e.g., about 514° F.) making them suitable for exposure to radiant heat during a fire. To provide additional radiant heat resistance during a fire (e.g., a fire on an aircraft or other vehicle), aluminum particles are dispersed within the thermoplastic polyurethane coating that is applied to the outside surfaces of the polyamide substrate. Dispersing the aluminum particles within the thermoplastic polyurethane coating traditionally results in the fabric or flexible composite material possessing an emissivity of about 0.72. While the thermoplastic polyurethane coating provides some radiant heat resistance, the higher melting point of the polyamide substrate allows for the fabric or flexible composite material to maintain its structural integrity. However, fabrics or flexible composite material utilizing polyamide substrates and thermoplastic polyurethane coatings are generally heavy, and or bulky, thereby taking up weight, space or volume on vehicles with weight restrictions such as aircraft.

The described embodiments of the invention provide fabrics or flexible composite materials for inflatable safety devices for a passenger vehicle. While the fabrics or flexible composite materials are discussed for use with aircraft inflatable safety devices, they are by no means so limited. Rather, embodiments of the fabrics or flexible composite materials may be used in inflatable safety devices or other safety devices of any type or otherwise as desired.

In various embodiments, the fabric or flexible composite materials described herein are utilized on inflatable safety equipment that is typically deflated, folded, and compressed to fit into confined areas on aircraft doors, within an aircraft fuselage, or in an aircraft storage compartment, thereby taking up space or volume on vehicles with volume restrictions such as aircraft.

Figure 1:
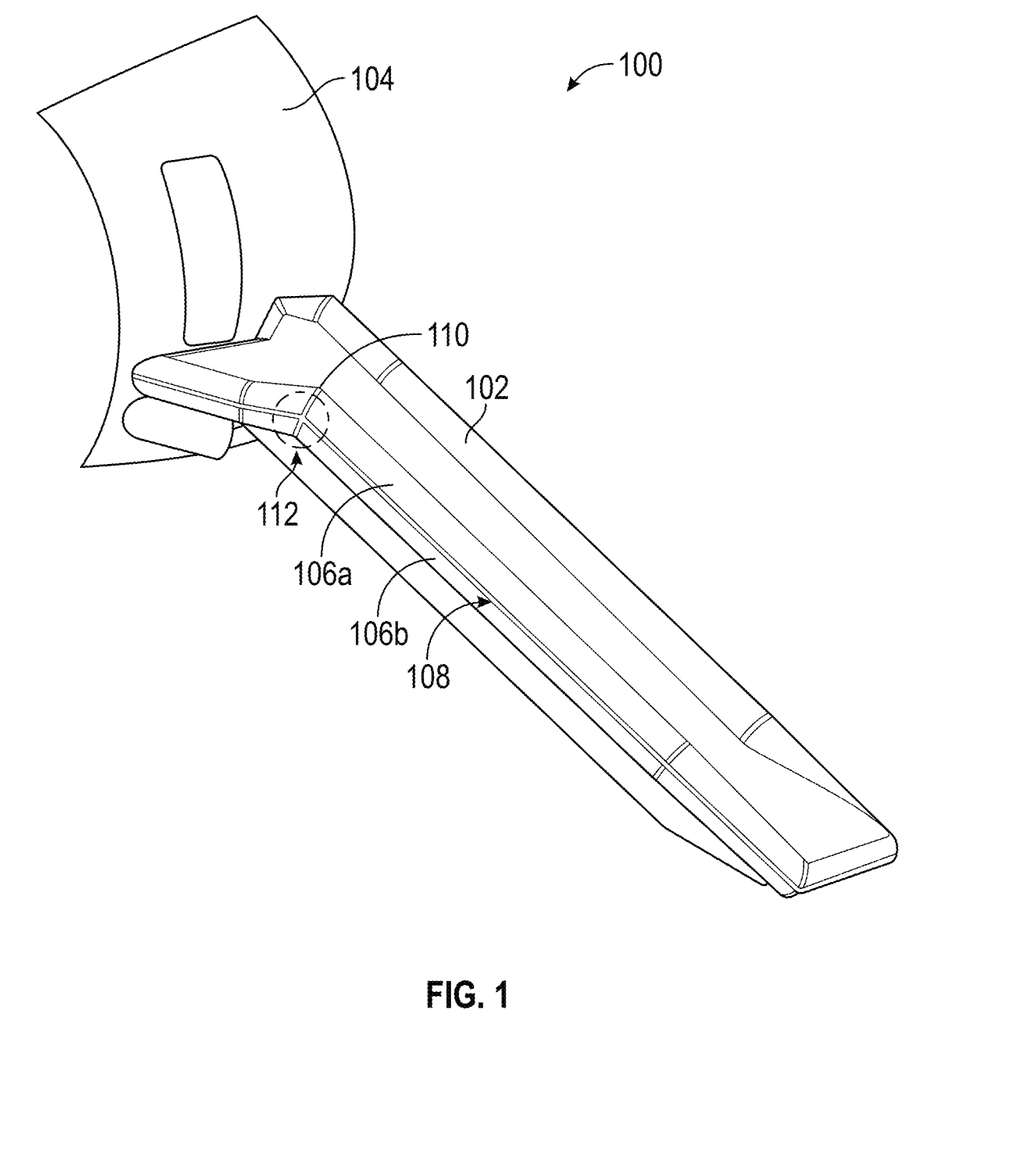
FIG. 1 is a perspective view of an inflatable safety device that includes a fabric or flexible composite material, according to certain embodiments of the present invention.

FIG. 1 is a perspective view of an inflatable safety device 100 that includes a fabric or flexible composite material 102, according to certain embodiments of the present invention. As illustrated in FIG. 1, the inflatable safety device 100 is connected to a passenger vehicle 104, such as an aircraft, though any other suitable inflatable safety devices (e.g., inflatable evacuation slide, inflatable slide/raft, inflatable ramp, or inflatable slide/ramp, and the like) that include the fabric or flexible composite material 102 may be connected to any other suitable passenger vehicles such as boats, ships, buses, trains, and the like.

The inflatable safety device 100 may include the fabric or flexible composite material 102. For example, the fabric or flexible composite material 102 may be, may include, or may be included in a surface material of the inflatable safety device 100. Additionally, the fabric or flexible composite material 102 may be the material of the inflatable safety device 100. For example, the fabric or flexible composite material 102 may form an enclosed shape of the inflatable safety device 100 and may be inflated with air and/or other gas to form an inflated version of the inflatable safety device 100. In some embodiments, the fabric or flexible composite material 102 includes a panel, floor, sliding surface, girt, patch, handle, structural attachment, pouch, accessory, component, or a seam tape of the inflatable safety device 100.

In some embodiments, the fabric or flexible composite material 102 includes one or more panels or substrates that are connected to form the inflatable safety device 100. As non-limiting examples, and referring to FIG. 1, the fabric or flexible composite material 102 may include panels 106a-b that may be connected by seam 108. In other embodiments, the inflatable safety device 100 may have other arrangements and/or configurations of the panels 106a-b (e.g., more than two or less than two panels may be included in the fabric or flexible composite material 102) and/or the seam 108 (e.g., more than one or less than one seam 108 may be included in the fabric or flexible composite material 102). In some embodiments, the seam 108 crosses with seam 110 at cross point 112. The seam 108 may be applied over the seam 110, or vice versa, for attaching panels of the fabric or flexible composite material 102 that may be displaced such that overlapping seams connect the panels.

The fabric or flexible composite material 102 may include various types of materials, optionally with different functionalities. As non-limiting examples, the fabric or flexible composite material 102 may include or be a gas-holding fabric or flexible composite material, a floor fabric or flexible composite material, a sliding surface fabric or flexible composite material, a girt fabric or flexible composite material, a patch fabric or flexible composite material, an accessory fabric or flexible composite material, a component fabric or flexible composite material, a seam tape fabric or flexible composite material, or the like.

Additionally, the fabric or flexible composite material 102 may be or may include material with a weight of less than or approximately 8 ounces/yd$^2$. In some embodiments, the weight of the fabric or flexible composite material 102 is less than or approximately 6 ounces/yd$^2$, such as less than or approximately 5 ounces/yd$^2$. In some embodiments, the weight of the fabric or flexible composite material 102 is less than or approximately 4 ounces/yd$^2$. In certain embodiments, the fabric or flexible composite material weight is less than 3 ounces/yd$^2$. In some embodiments, the weight of the fabric or flexible composite material 102 is less than or approximately 2 ounces/yd$^2$. In some embodiments, the weight of the fabric or flexible composite material 102 is less than or approximately 1 ounce/yd$^2$. In some embodiments, the weight of the fabric or flexible composite material 102 is less than or approximately 0.5 ounces/yd$^2$.

Figure 2:
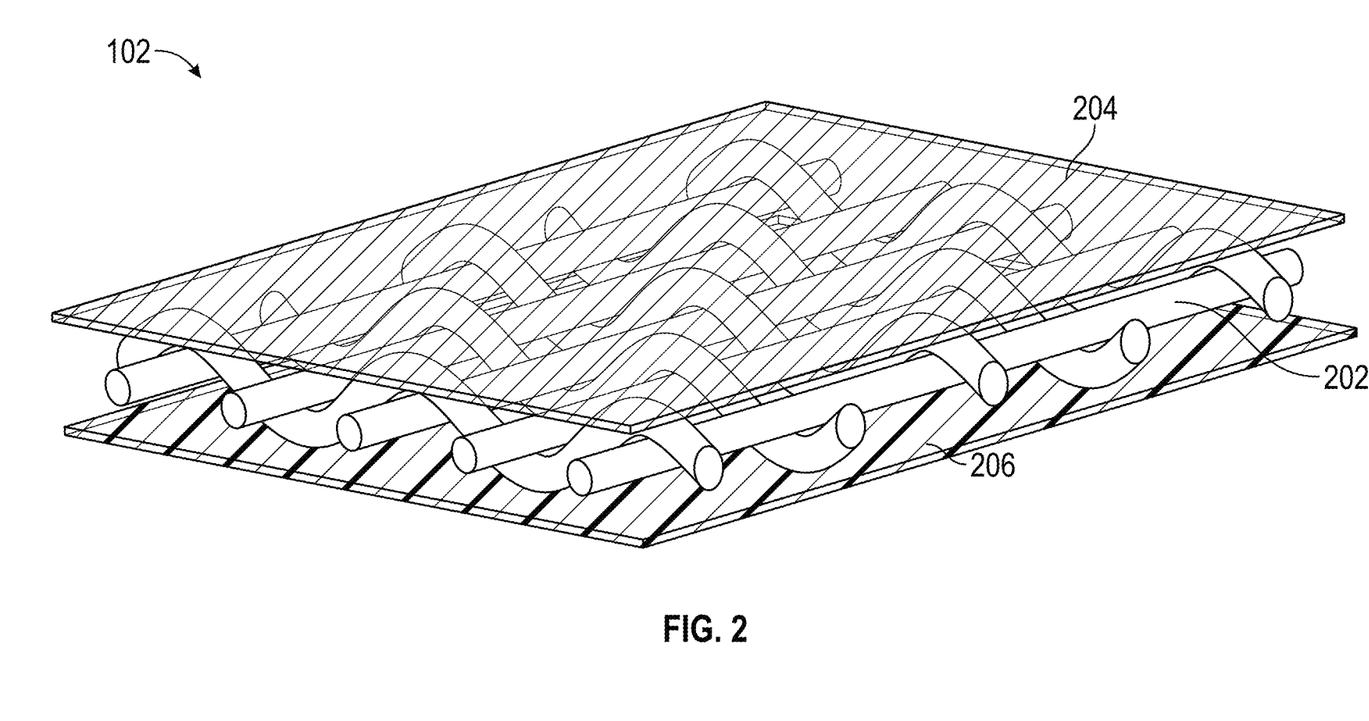
FIG. 2 is a sectional perspective view of one example of the fabric or flexible composite material of FIG. 1.
Figure 3:
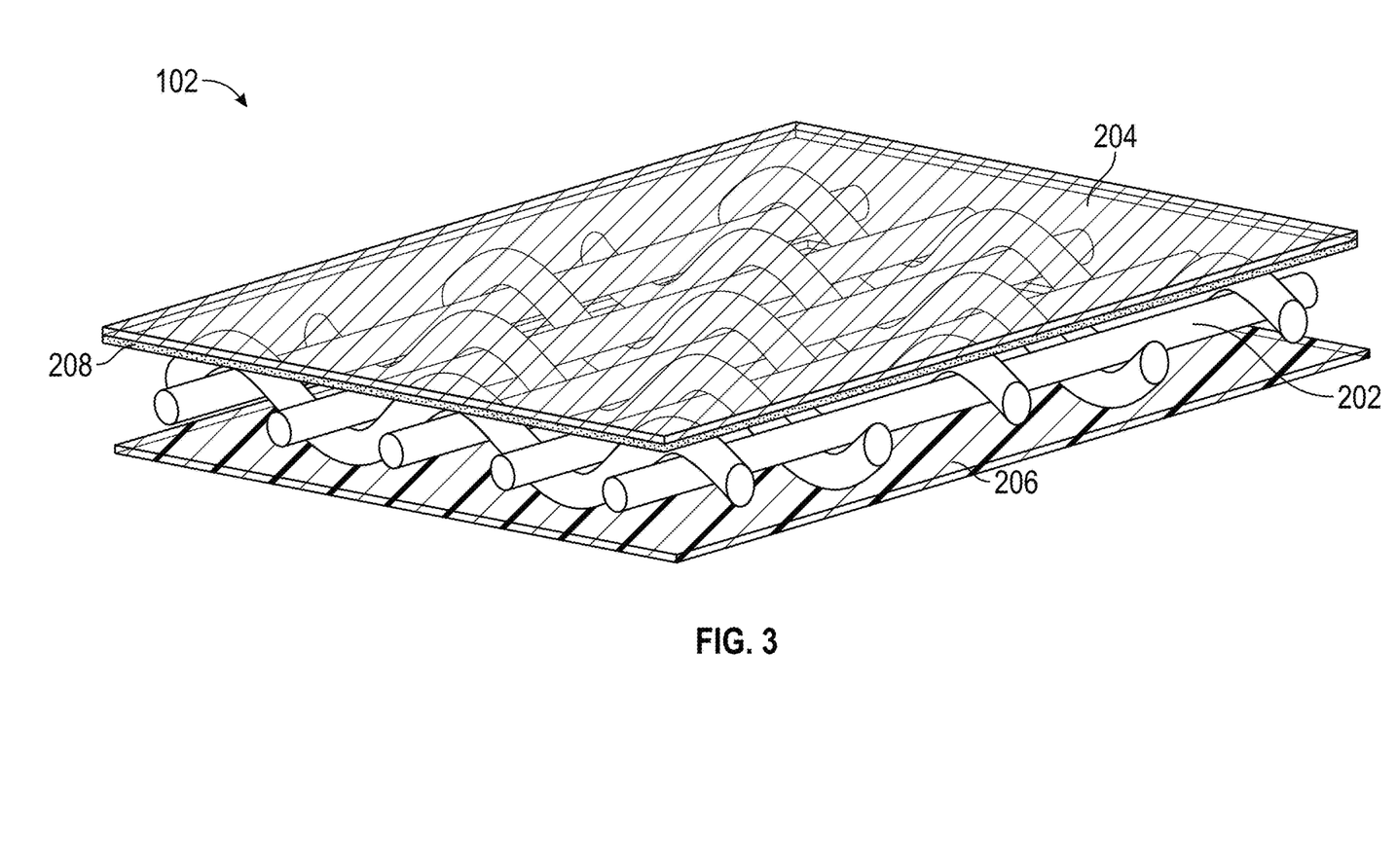
FIG. 3 is a sectional perspective view of another example of the fabric or flexible composite material of FIG. 1.
Figure 4:
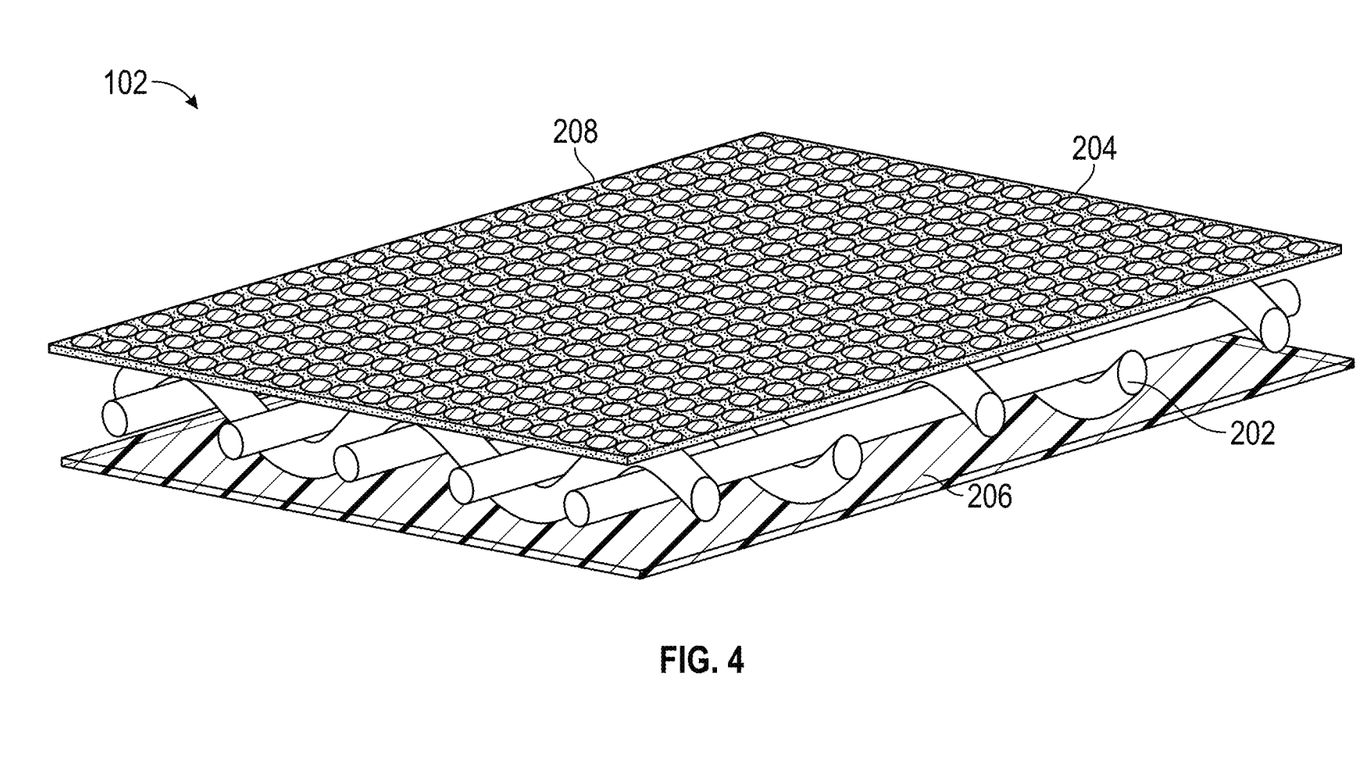
FIG. 4 is a sectional perspective view of yet another example of the fabric or flexible composite material of FIG. 1.

According to certain embodiments of the present invention, and as best shown in FIGS. 2-4, the fabric or flexible composite material 102 includes a substrate 202 and a metallic layer 204. The substrate 202 may define a surface for the fabric or flexible composite material 102, and the metallic layer 204 may cover at least one surface defined by the substrate 202. In some embodiments, the metallic layer 204 may be completely covering on the at least one surface defined by the substrate 202. In some embodiments, at least a portion of the substrate 202 is not covered by the metallic layer 204.

In some embodiments, the fabric or flexible composite material 102 additionally includes an inner layer 206. The metallic layer 204 may be provided on a first surface (e.g., the top) of the substrate 202, and the inner layer 206 may be provided on a second surface (e.g., the bottom) of the substrate 202. The inner layer 206 may provide an air-tight or gas-tight seal for the fabric or flexible composite material 102. For example, the inner layer 206 may include a plastic-based layer, a urethane-based layer, a metallic layer, or any other suitable layer that can be positioned on the second surface of the substrate 202 for allowing the fabric or flexible composite material 102 to be inflated with air or other gases.

The substrate 202 may include various different types or combinations of substrate materials. As non-limiting examples, the substrate 202 may include one or more of polyethylene, ultra-high molecular weight polyethylene, polypropylene, polyester, polyamide, aromatic polyamide, aramid, polyolefin, aromatic polyester, polyarylate, other liquid crystal polymers, or nylon, other suitable substrate material, or any combination thereof. As additional non-limiting examples, the substrate may be a material such as but not limited to those sold under the trade names Dyneema®, Spectra®, Innegra®, Vectran®, Nylon-6, or Nylon 6-6. In certain embodiments, substrate 102 may have a weight of less than or approximately 4.5 ounces/yd$^2$, such as less than or approximately 3.5 ounces/yd$^2$, such as less than or approximately 3.0 ounces/yd$^2$, such as less than or approximately 2.5 ounces/yd$^2$, such as less than or approximately 2.0 ounces/yd$^2$, such as less than or approximately 1.5 ounces/yd$^2$, such as less than or approximately 1.0 ounce/yd$^2$, such as less than or approximately 0.5 ounces/yd$^2$.

In embodiments in which the substrate 202 is or includes polyethylene, the substrate 202 is or includes ultra-high molecular weight polyethylene.

Additionally, or alternatively, the material of the substrate 202 may involve a melting point that is less than a polyamide substrate. For example, the material of the substrate 202 may be characterized by a melting point of less than or approximately 500° F., such as a melting temperature less than or approximately 450° F., such as a melting temperature less than or approximately 400° F., such as a melting temperature less than or approximately 350° F., such a melting temperature less than or approximately 300° F.

As mentioned, in certain embodiments, the metallic layer 204 may be a completely covering layer of the fabric or flexible composite material 102, meaning that the portions of the metallic layer 204 are interconnected even though an entirety of the at least one surface of the substrate 202 is not necessarily covered. In FIG. 3, the metallic layer 204 covers the entirety of the at least one surface of the substrate 202.

Additionally, the metallic layer 204 may include various metals or metallic elements as desired, including but not limited to aluminum, an aluminum alloy, titanium, a titanium alloy, nickel, a nickel alloy, brass, a brass alloy, steel, a steel alloys, stainless steel or a stainless steel alloy, silver, a silver alloy, combinations thereof, or any other suitable metal or metallic alloy. In other non-limiting examples, the metallic layer 204 includes other types of metallic elements, such as titanium, zinc, and the like, or metallic alloys such as titanium alloys, zinc alloys, and the like. The metallic layer 204 may provide the fabric or flexible composite material 102 with enhanced features. As a non-limiting example, the metallic layer 204 may increase a melting point of the fabric or flexible composite material 102, may increase a strength of the fabric or flexible composite material 102, and the like.

The metallic layer 204 may be deposited on, adhered to, or otherwise positioned on the substrate 202 and/or an intermediate layer 208 using various techniques as desired. As a non-limiting example, the metallic layer 204 may be printed on the substrate 202 and/or the intermediate layer 208, may be adhered to the substrate 202 and/or the intermediate layer 208 via epoxies or other adhering materials, may be vapor-deposited on the substrate 202 and/or the intermediate layer 208, or the like. In some embodiments, a metallic foil layer is adhered to the substrate 202 and/or the intermediate layer 208. In some embodiments, the metallic layer 204 is plated on the substrate 202 and/or the intermediate layer 208, sputtered on the substrate 202 and/or the intermediate layer 208, or the like. In some embodiments, the metallic layer 204 is positioned on the substrate 202 and/or the intermediate layer 208, on other components of the fabric or flexible composite material 102, or on the fabric or flexible composite material 102 itself.

Figure 5:
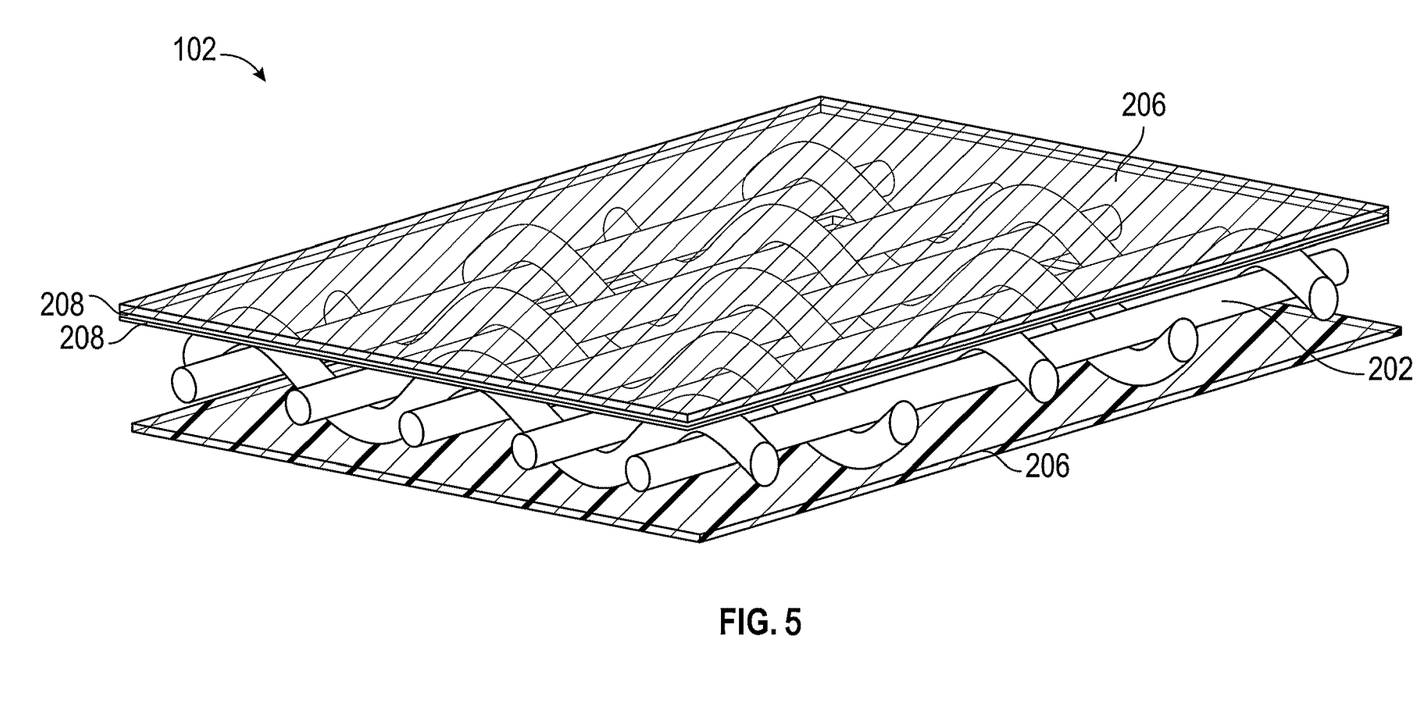
FIG. 5 is a cross-sectional view of a fabric or flexible composite material, with a completely covering metallic layer for an inflatable safety product and that includes a substrate with an adhesive layer and a film layer that the metallic layer is covering according to certain embodiments of the present invention.

As best illustrated with respect to FIGS. 3 and 5, a fabric or flexible composite material may include one or more intermediate adhesive layers and/or film layers 208. The intermediate adhesive layer and/or film layer(s) 208 may facilitate adhering of the metallic layer 204 to the substrate 202. FIG. 3 illustrates a single intermediate adhesive layer and/or film layer 208, and FIG. 5 illustrates a plurality of intermediate adhesive layers and/or film layers 208. The number of intermediate adhesive layers and/or film layers illustrated in FIGS. 2 and 5 is for illustrative purposes only and should not be considered limiting. In various embodiments, a fabric or flexible composite material according to embodiments may include an adhesive layer, a film layer, or both an adhesive layer and a film layer. For example, an intermediate adhesive layer and/or film layer 208 may be positioned on the surface provided by the substrate 202. The intermediate adhesive layer and/or film layer 208 may include an adhesive layer, a film layer, or any other suitable layer that can be positioned between the substrate 202 and the metallic layer 204, which may be an outermost layer of the fabric or flexible composite material 102. The intermediate adhesive layer and/or film layer 208 may include a material that adheres to the substrate 202 and that can receive the metallic layer 204. For example, the intermediate adhesive layer and/or film layer 208 may be deposited on, attached to, or otherwise positioned on the substrate 202, and the metallic layer 204 may be deposited on, plated on, sputtered on, attached to, adhered to or otherwise positioned on the intermediate layer 208.

In certain embodiments the adhesive layers and/or film layers 208 may be acrylic, nylon, polyolefin, modified polyolefin, polyurethane, vinyl, polyethylene (PE), polypropylene (PP), polyamide (PA), fluoropolymer, polyethylene terephthalate (PET), polystyrene, ethylene vinyl acetate (EVOH), polyvinylidene chloride (PVDC), polycarbonate (PC), polyvinyl chloride (PVC), polylactic acid (PLA), polyvinyl alcohol (PVOH), ethylene-chlorotrifluoroethylene, polyetherketone (PEK), polyetheretherketone (PEEK), polyetherketoneketone (PEKK), or any combination thereof, or any appropriate materials.

In some embodiments, the metallic layer 204 is an outermost layer of the fabric or flexible composite material 102, although in other embodiments, the metallic layer 204 is not an outermost layer of the fabric or flexible composite material 102. As a non-limiting example, a protective top layer and/or other type of top layer as desired (not illustrated) may be the outermost layer and may be positioned on the metallic layer 204. Optionally, and when included, the protective top layer may include a thin film layer or other suitable layer that can prevent damage, inhibit corrosion, and/or inhibit oxidation of the metallic layer 204. In another embodiment, the exterior layer may prevent deterioration of the fabric or flexible composite material due to hydrolysis. In another embodiment, the metallic layer is covered by an exterior layer to promote adhesion to seam tapes, girt materials, floor materials, sliding surface materials, patch materials, accessory materials, component materials, or other materials or components. In another embodiment, the metallic layer is covered by an exterior layer to increase the durability of the metallic layer, fabric, or flexible composite material. In some embodiments, the protective top layer optionally includes a passivation layer, a parkerized layer, or other suitable layer that may be formed via a controlled oxidation process. When included, the exterior layer may be various types of materials as desired. In one non-limiting example, the exterior layer may be an acrylic coating, although in other embodiments other suitable materials may be utilized as desired. Optionally, and when included, the exterior layer may include a thin film layer or other suitable layer As best illustrated with respect to FIG. 4, the metallic layer 204 of the fabric or flexible composite material 102 optionally may be provided on the substrate 202 and/or the intermediate layer 208 in various patterns as desired. For example, the metallic layer 204 may be deposited on the substrate 202 and/or the intermediate layer 208 in a particular pattern covering at least one surface of the substrate 202 and/or the intermediate layer 208. Moreover, while a single pattern is illustrated in FIG. 4, in other embodiments, a plurality of patterns may be provided on the substrate 202 and/or the intermediate layer 208 as desired. In various embodiments, the metallic layer 204 is provided on the at least one surface of the substrate 202 and/or the intermediate layer 208 such that portions of the at least one surface of the substrate 202 are not covered by the metallic layer. Optionally, the uncovered portions of the substrate 202 and/or the intermediate layer 208 may allow for an adhesive and/or other material to be provided and directly engage the substrate 202 and/or the intermediate layer 208 (e.g., when joining two fabrics or flexible composite materials) while maintaining the improved performance of the metallic layer 204. The portions of the metallic layer 204 forming the pattern may be completely covering or discontinuous. In some embodiments, the metallic layer 204 is deposited in a pattern on the substrate 202 and/or the intermediate layer 208 such that the metallic layer 204 is in a regular, discontinuous pattern. In some embodiments, the metallic layer 204 is composed of a set of metallic elements positioned on (e.g., deposited on, sputtered on, plated on, etc.) the intermediate layer 208.

FAA Requirements

In various embodiments, the fabric or flexible composite material described herein may meet and/or exceeds the fabric or flexible composite material requirements according to TSO-C69c from the Federal Aviation Administration (FAA), entitled EMERGENCY EVACUATION SLIDES, RAMPS, RAMP/SLIDES, AND SLIDE RAFTS and published Aug. 18, 1999 ("TSO-C69c") (incorporated herein by reference), TSO-C13f from the FAA, entitled LIFE PRESERVERS and published Sep. 24, 1992 ("TSO-C13f") (incorporated herein by reference), and/or TSO-C70b from the FAA, entitled LIFE RAFTS and published Aug. 4, 2014 ("TSO-C70b") (incorporated herein by reference).

Required tests include: seam peel strength, seam shear strength, tensile strength (grab test), tear strength (trapezoid test), tear strength (tongue test), ply adhesion, coat adhesion, temperature resistance, radiant heat resistance, puncture strength, tear propagation, chafe resistance, flammability (vertical burn rate), pressure retention, permeability, porosity (hydrolysis), hydrolysis conditioning, resistance to hydrolysis, fluids exposure, and accelerated aging Seam Adhesion
TSO-C69c Requirement As a non-limiting example, the fabric or flexible composite material adhered or welded to the fabric or flexible composite material of the inflatable safety product creating a seam region, when separated from the fabric or flexible composite material of the inflatable safety product, at or about a 180° angle, at a separation rate of between 2 and 2.5 inches/minute, at a temperature between 70° F. to 72° F., wherein the average of at least 5 specimens must resist separation with a force of 5 pounds/inch width or greater. The aforementioned resistance to separation, described herein peel strength as referenced in TSOs, such as but not limited to TSO-C69c from the FAA.

As a further non-limiting example, any coatings, films, or layers applied to the substrate of the fabric or flexible composite material, when separated from the substrate or other layers used in the construction of the fabric or flexible composite material, of the inflatable safety product, at or about a 180° angle, at a separation rate of between 2 and 2.5 inches/minute, at a temperature of between 70° F. to 72° F., wherein the average of at least 5 specimens must resist separation with a force of 5 pounds/inch width or greater. The aforementioned resistance to separation, described herein ply adhesion and coating adhesion as referenced in TSOs, such as but not limited to TSO-C69c from the FAA.

Seam Shear
TSO-C69c Requirement

As a non-limiting example, the fabric or flexible composite material adhered or welded to the fabric or flexible composite material of the inflatable safety product creating a seam region, when used to create a specimen of the seam region and with the fabric or flexible composite material adhered or welded with a ¾ inch maximum overlap, at a separation rate between 11.5 and 12.5 inches/minute, at a temperature of 75° F., wherein the average of at least 3 specimens must resist separation with a force of 175 pounds/inch width or greater when pulled in the shear direction.

As a further non-limiting example, the fabric or flexible composite material adhered or welded to the fabric or flexible composite material of the inflatable safety product creating a seam region, when used to create a specimen of seam region 2 inches in length and with the fabric or flexible composite material adhered or welded at a ¾ inch maximum overlap, at a separation rate of between 11.5 and 12.5 inches/minute, at a temperature of 140° F., wherein the average of at least 3 specimens must resist separation with a force of 40 pounds/inch width or greater when the pulled in the shear direction. The aforementioned resistance to separation, describes shear strength as referenced in TSOs, such as but not limited to TSO-C69c from the FAA.

Tensile and Tear Strength
TSO-C69c Requirement

As a non-limiting example, the fabric or flexible composite material of the inflatable safety product, when at least 5 specimens prepared as per Federal Test Method Standard-Method 5134 (Tongue Test), are placed between 2 jaws that are 3 inches apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a non-limiting example, the fabric or flexible composite material of the inflatable safety product, when at least 5 specimens prepared as per Federal Test Method Standard-Method 5136 (Trapezoid Test), are placed between 2 jaws that are 1 inch apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a further non-limiting example, after aging (exposed to a temperature of 158±4° F. for not less than 168 hours), the fabric or flexible composite of the inflatable safety product, when at least 5 specimens prepared as per Federal Test Method Standard-Method 5134 (Tongue Test), are placed between 2 jaws that are 3 inches apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a further non-limiting example, after aging, the fabric or flexible composite material of the inflatable safety product, when at least 5 specimens prepared as per Federal Test Method Standard-Method 5136 (Trapezoid Test), are placed between 2 jaws that are 1 inch apart and subjected to a separation rate between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a non-limiting example, the fabric or flexible composite material of the inflatable safety product, when at least 5 specimens prepared as per Federal Test Method Standard-Method 5100 (Grab Test), are placed between 2 jaws that are 3 inches apart and subjected to a separation rate between 11.5 and 12.5 inches/minute, at a temperature of 68° F. to 72° F., must resist separation with a maximum force of an average of at least 190 pounds/inch in warp direction and fill direction (along the manufacturing length and width of the fabric or flexible composite material).

As a further non-limiting example, after aging, the fabric or flexible composite material of the inflatable safety product, when at least 5 specimens prepared as per Federal Test Method Standard-Method 5100 (Grab Test), are placed between 2 jaws that are 3 inches apart and subjected to a separation rate between 11.5 and 12.5 inches/minute, at a temperature of 68° F. to 72° F., must a resist separation with a maximum force of an average of at least 190 pounds/inch in warp direction and fill direction (along the manufacturing length and width of the fabric or flexible composite material).

Air Holding & Gas Holding
TSO-C69c Requirement

As a non-limiting example, the fabric or flexible composite material, described herein when configured into an inflatable safety product must withstand a pressure of at least 1.5 times the maximum operating pressure for at least 5 minutes of its intended use.

As a further non-limiting example, the fabric or flexible composite material, described herein when configured into an inflatable safety product must withstand a pressure of at least 2 times the maximum operating pressure for at least 1 minute, of its intended use.

As a further non-limiting example, the fabric or flexible composite material, described herein when configured into an inflatable safety inflatable safety product, when inflated to its operating pressure of intended use must not fall below at least 50 percent of its initial pressure in a period less than 12 hours.

As a further non-limiting example, the fabric or flexible composite material, described herein when configured into an inflatable safety product, that is capable of being used as a life raft or flotation device when inflated to its operating pressure of intended use must not fall below the minimum raft mode operating pressure in less than 24 hours.

Helium Permeability
TSO-C69c Requirement

As a non-limiting example, the fabric or flexible composite material of the inflatable safety product, when at least 3 specimens are prepared and tested as per Federal Test Method Standard-Method 5460 or ASTM Method D1434-82, Procedure V, have a maximum permeability of Helium of 10 liters per square meter in 24 hours at 77° F. or its equivalent in Hydrogen when a pressure is applied to the chamber on the side of the test specimen that separates the test gas (Helium or its equivalent in Hydrogen) from the chamber receiving the permeating gas.

Temperature Resistance
TSO-C69c Requirement:

As a non-limiting example, the fabric or flexible composite material, seam tape, accessory material and or product accessories described herein when exposed to temperatures from −40° F. to 160° F. must remain fully functioning per its intended use as referenced in TSOs, such as but not limited to TSO-C69c from the FAA.

As a further non-limiting example, the fabric or flexible composite material, seam tape, accessory material and or product accessories described herein must remain fully functioning per its intended use after exposure to a storage temperature of 185° F. or greater as referenced in TSOs, such as but not limited to TSO-C69c from the FAA.

As a further non-limiting example, the fabric or flexible composite material, seam tape, accessory material and or product accessories described herein must remain fully functioning per its intended use after being stowed at a temperature −65° F. or less as referenced in TSOs, such as but not limited to TSO-C69c from the FAA.

Radiant Heat Resistance
TSO-C69c Requirement

As a further non-limiting example, the fabric or flexible composite material described herein when exposed to a radiant heat flux of 1.5 Btu/ft$^2$-sec or greater, wherein a pressure applied to the surface opposite the heat source does not decrease for at least 90 seconds when the surface opposite the heat source is subjected to a higher pressure than the surface subjected to the heat source, wherein the average of the time to pressure decrease of at least 3 specimens of the fabric or flexible composite is at least 180 seconds or greater.

Fluids Exposure
TSO-C70b Requirement

As a further non-limiting example, the fabric or flexible composite material described herein must be capable of withstanding the detrimental effects of exposure to fuels, oils, hydraulic fluids, and sea water. After being exposed to fuels, oils, hydraulic fluids, and sea water, a seam will not have a decrease in seam strength or coat adhesion of more than 10%.

As a further non-limiting example, the fabric or flexible composite material, described herein must remain capable of withstanding the detrimental effects of exposure to fuels, oils, hydraulic fluids, and sea water with no loss in air holding or gas holding properties. After being exposed to fuels, oils, hydraulic fluids, and sea water, the fabric or flexible composite material, wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 10% as referenced in TSOs, such as but not limited to TSO-C70b from the FAA.

Hydrolysis
TSO-C69c Requirement

As a further non-limiting example, the fabric or flexible composite material, described herein must remain capable of withstanding the detrimental effects of hydrolysis exposure to a temperature of 136±4° F. at a relative humidity of 95±4 percent for a period of 50 days with no loss in air holding or gas holding properties. After hydrolysis exposure to a temperature of 136±4° F. at a relative humidity of 95±4 percent for a period of 50 days the fabric or flexible composite material, wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 20% as referenced in TSOs, such as but not limited to TSO-C69c from the FAA.

Tear Propagation
TSO-C69c Requirement

As a non-limiting example, the fabric or flexible composite material, described herein when must not allow a tear to propagate beyond the implement that caused an initial puncture or tear as referenced in TSOs, such as but not limited to TSO-C69c from the FAA.

Accelerated Aging
TSO-C69c Requirement

As a further non-limiting example, the fabric or flexible composite material, described herein must remain capable of withstanding the detrimental effects of accelerated aging at a temperature of 158±4° F. for not less than 168 hours with no loss in air holding or gas holding properties. After accelerated aging at a temperature of 158±4° F. for not less than 168 hours the fabric or flexible composite material, seam tape, accessory material wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 10% as referenced in TSOs, such as but not limited to TSO-C69c from the FAA.

Flammability
TSO-C69c Requirement

As a non-limiting example, the fabric or flexible composite material, described herein, wherein the average of at least 3 specimens in warp direction and fill direction (along the manufacturing length and width of the fabric or flexible composite material material) are located ¾ inches above the top edge of a burner apparatus, for a period of 12 seconds is exposed to a flame with a total length of 1.5 inches and an inner cone length of ⅞ inches, and minimum temperature of 1550° F., shall not burn for more than 15 seconds after the flame is removed, shall not burn more than 8 inches in the vertical direction, wherein any material that drips form the specimen shall not burn to more than 5 seconds, as referenced such as but not limited to the flammability requirements of 14 CFR part 25.853 (a), Appendix F, Part I (a)(1)(ii) as referenced in TSOs, such as but not limited to TSO-C69c from the FAA.

EXAMPLES

A collection of exemplary embodiments is provided below, including at least some explicitly enumerated as "Examples" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Example 1. A fabric or flexible composite material for an inflatable safety product, the fabric or flexible composite material comprising: a substrate defining a surface; and a metallic layer covering at least one surface of the substrate.

Example 2. The fabric or flexible composite material of the preceding or subsequent examples or combination of examples, wherein the substrate comprises polyethylene.

Example 3. The fabric or flexible composite material of the preceding or subsequent examples or combination of examples, wherein the substrate comprises ultra-high molecular weight polyethylene.

Example 4. The fabric or flexible composite material of the preceding or subsequent examples or combination of examples, wherein the substrate comprises a material with a melting point less than a polyamide substrate.

Example 5. The fabric or flexible composite material of claim 1, wherein the substrate comprises a material with a melting point less than 300° F.

Example 6. The fabric or flexible composite material of the preceding or subsequent examples or combination of examples, wherein at least a portion of the substrate is not covered by the metallic layer.

Example 7. The fabric or flexible composite material of the preceding or subsequent examples or combination of examples, wherein the metallic layer is provided as a pattern covering at least one surface of the substrate.

Example 8. The fabric or flexible composite material of the preceding or subsequent examples or combination of examples, wherein the metallic layer comprises aluminum, an aluminum alloy, titanium, a titanium alloy, nickel, a nickel alloy, brass, a brass alloy, steel, a steel alloys, stainless steel, a stainless steel alloy, silver, or a silver alloy.

Example 9. The fabric or flexible composite material of the preceding or subsequent examples or combination of examples, wherein the metallic layer is printed on the fabric or flexible composite material, adhered to the fabric or flexible composite material, or vapor deposited on the fabric or flexible composite material, or a plated metallic layer on the fabric or flexible composite material, a metallic foil layer, or a sputtered metallic layer on the fabric or flexible composite material.

Example 10. The fabric or flexible composite material of the preceding or subsequent examples or combination of examples, wherein: the metallic layer is an outermost layer of the fabric or flexible composite material; or the metallic layer is covered by an exterior layer.

Example 11. The fabric or flexible composite material of the preceding or subsequent examples or combination of examples, wherein the metallic layer is covered by an exterior layer to prevent damage, oxidation, and/or corrosion of the metallic layer.

Example 12. The fabric or flexible composite material of the preceding or subsequent examples or combination of examples, wherein the metallic layer is covered by an exterior layer to prevent deterioration of the fabric or flexible composite material due to hydrolysis.

Example 13. The fabric or flexible composite material of the preceding or subsequent examples or combination of examples, wherein the metallic layer is covered by an exterior layer to promote adhesion to the metallic layer.

Example 14. The fabric or flexible composite material of the preceding or subsequent examples or combination of examples, wherein the metallic layer is covered by an exterior layer to improve the durability of the metallic layer.

Example 15. The fabric or flexible composite material of the preceding or subsequent examples or combination of examples, wherein the substrate comprises a material with a melting point less than 400° F.

Example 16. The fabric or flexible composite material of the preceding or subsequent examples or combination of examples, wherein the fabric or flexible composite material is a gas-holding fabric or flexible composite material, floor fabric or flexible composite material, a sliding surface fabric or flexible composite material, a girt fabric or flexible composite material, patch fabric or flexible composite material, an accessory fabric or flexible composite material, a component fabric or flexible composite material, or a seam tape fabric or flexible composite material.

Example 17. The fabric or flexible composite material of the preceding or subsequent examples or combination of examples, wherein the fabric or flexible composite material comprises a fabric or flexible composite material weight less than 8 ounces/yd$^2$.

Example 18. The fabric or flexible composite material of the preceding or subsequent examples or combination of examples, wherein the fabric or flexible composite material comprises a fabric or flexible composite material weight less than 4 ounces/yd$^2$.

Example 19. The fabric or flexible composite material of the preceding or subsequent examples or combination of examples, wherein the fabric or flexible composite material weight is less than 2 ounces/yd$^2$.

Example 20. An inflatable safety product comprising the fabric or flexible composite material of the preceding or subsequent examples or combination of examples as a panel, floor, sliding surface, girt, patch, handle, structural attachment, pouch, accessory, component, or as a seam tape.

Example 21. The inflatable safety product of the preceding or subsequent examples or combination of examples, wherein the inflatable safety product comprises an inflatable evacuation slide, inflatable evacuation slide/raft, inflatable evacuation ramp, or inflatable evacuation slide/ramp.

Example 22. A fabric or flexible composite material for an inflatable safety product, the fabric or flexible composite material comprising: a substrate defining a surface, the substrate comprising one or more of polyethylene, ultra-high molecular weight polyethylene, polypropylene, polyester, polyamide, aromatic polyamide, aramid, polyolefin, aromatic polyester, polyarylate, other liquid crystal polymers, or nylon; and a metallic layer covering at least one surface of the substrate.

Example 23. The fabric or flexible composite material of the preceding or subsequent examples or combination of examples, wherein the metallic layer is a completely covering metallic layer.

Example 24. The fabric or flexible composite material of the preceding or subsequent examples or combination of examples, wherein at least a portion of the surface of the fabric or flexible composite material is not covered by the metallic layer.

Example 25. A fabric or flexible composite material for an inflatable safety product, the fabric or flexible composite material comprising: a substrate defining a surface; and a metallic layer on the surface of the fabric or flexible composite material, wherein the metallic layer is an outermost layer of the fabric or flexible composite material.

Example 26. The fabric or flexible composite material of the preceding or subsequent examples or combination of examples, wherein the substrate comprises polyethylene, ultra-high molecular weight polyethylene, polypropylene, polyester, polyamide, aromatic polyamide, aramid, polyolefin, aromatic polyester, polyarylate, other liquid crystal polymers, or nylon, and wherein the metallic layer is a completely covering layer and comprises aluminum, an aluminum alloy, titanium, a titanium alloy, nickel, a nickel alloy, brass, a brass alloy, steel, a steel alloys, stainless steel or a stainless steel alloy, silver, a silver alloy, combinations thereof, or any other suitable metal or metallic alloy.

Example 27. A fabric or flexible composite material for an inflatable safety product, the fabric or flexible composite material comprising: a substrate defining a surface; and a completely covering metallic layer covering at least one surface of the substrate.

Example 28. The fabric or flexible composite material of the preceding or subsequent examples or combination of examples, wherein the metallic layer is covered by an exterior layer to prevent damage, oxidation and/or corrosion of the metallic layer.

Example 29. The fabric or flexible composite material of the preceding or subsequent examples or combination of examples, wherein the metallic layer is covered by an exterior layer to prevent deterioration of the fabric or flexible composite material due to hydrolysis.

Example 30. The fabric or flexible composite material of the preceding or subsequent examples or combination of examples, wherein the metallic layer is covered by an exterior layer to promote adhesion to the metallic layer and/or to improve the durability of the metallic layer.

Example 31. The fabric or flexible composite material of the preceding or subsequent examples or combination of examples, wherein the metallic layer is covered by an exterior layer to improve the durability of the metallic layer.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

The use of the terms "a" and "an" and "the" and similar referents in the context of describing the invention (especially in the context of the following claims) are to be construed to cover both the singular and the plural, unless otherwise indicated herein or clearly contradicted by context. Directional references such as "up," "down," "top," "bottom," "left," "right," "front," and "back," among others, are intended to refer to the orientation as illustrated and described in the FIG. (or figures) to which the components and directions are referencing. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, the nearness of completion will be so as to have the same overall result as if absolute and total completion were obtained.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

That which is claimed is:

1. An inflatable safety product comprising a fabric or flexible composite material, the fabric or flexible composite material comprising:

a substrate defining a surface, wherein the substrate comprises a material with a melting point less than a polyamide substrate;

a metallic layer provided as a pattern and covering at least one surface of the substrate, wherein the metallic layer is an outermost layer of the fabric or flexible composite material, wherein the metallic layer is a completely covering layer that consists of one or more metals, and wherein the pattern extends from a first edge of the substrate to a second edge of the substrate to cover an entire surface of the substrate; and an interior layer on a second surface of the substrate opposite the at least one surface, wherein the interior layer is an air-tight layer, wherein the inflatable safety product comprises an inflatable evacuation slide, inflatable evacuation slide/raft, inflatable evacuation ramp, or inflatable evacuation slide/ramp.

2. The inflatable safety product of claim 1, wherein the substrate comprises polyethylene.

3. The inflatable safety product of claim 2, wherein the substrate comprises ultra-high molecular weight polyethylene.

4. The inflatable safety product of claim 1, wherein the substrate comprises a material with a melting point less than 300° F.

5. The inflatable safety product of claim 1, wherein the metallic layer comprises aluminum, an aluminum alloy, titanium, a titanium alloy, nickel, a nickel alloy, brass, a brass alloy, steel, a steel alloy, stainless steel, a stainless steel alloy, silver, or a silver alloy.

6. The inflatable safety product of claim 1, wherein the metallic layer is printed on the fabric or flexible composite material, adhered to the fabric or flexible composite material, or vapor deposited on the fabric or flexible composite material, or a plated metallic layer on the fabric or flexible composite material, a metallic foil layer, or a sputtered metallic layer on the fabric or flexible composite material.

7. The inflatable safety product of claim 1, wherein the substrate comprises a material with a melting point less than 400° F.

8. The inflatable safety product of claim 1, wherein the fabric or flexible composite material is a gas-holding fabric or flexible composite material, floor fabric or flexible composite material, a sliding surface fabric or flexible composite material, a girt fabric or flexible composite material, patch fabric or flexible composite material, an accessory fabric or flexible composite material, a component fabric or flexible composite material, or a seam tape fabric or flexible composite material.

9. The inflatable safety product of claim 1, wherein the fabric or flexible composite material comprises a fabric or flexible composite material weight less than 8 ounces/yd$^2$.

10. The inflatable safety product of claim 1, wherein the fabric or flexible composite material comprises a fabric or flexible composite material weight less than 4 ounces/yd$^2$.

11. The inflatable safety product of claim 1, wherein the fabric or flexible composite material weight is less than 2 ounces/yd$^2$.

12. The inflatable safety product of claim 1, wherein the fabric or flexible composite material is provided as a panel of the inflatable safety product, a floor of the inflatable safety product, a sliding surface of the inflatable safety product, a girt of the inflatable safety product, a patch of the inflatable safety product, a handle of the inflatable safety product, a structural attachment of the inflatable safety product, a pouch of the inflatable safety product, an accessory of the inflatable safety product, a component of the inflatable safety product, or a seam tape of the inflatable safety product.

13. An inflatable safety product comprising a fabric or flexible composite material, the fabric or flexible composite material comprising:
    a substrate defining a surface, the substrate comprising ultra-high molecular weight polyethylene;
    a metallic layer covering at least one surface of the substrate, wherein the metallic layer is provided as a pattern covering at least one surface of the substrate and such that a portion of the substrate is not covered by the metallic layer, the portion of the substrate not covered by the metallic layer providing an adhesion of at least 5 lbs/in, the pattern extending from a first edge of the substrate to a second edge of the substrate to cover an entire surface of the substrate;
    an exterior layer that covers the metallic layer, wherein the exterior layer is an outermost layer of the fabric or flexible composite material; and
    an interior layer on a second surface of the substrate opposite the at least one surface, wherein the interior layer is an air-tight layer, and wherein the inflatable safety product comprises an inflatable evacuation slide, inflatable evacuation slide/raft, inflatable evacuation ramp, or inflatable evacuation slide/ramp.

14. An inflatable safety product comprising a fabric or flexible composite material, the fabric or flexible composite material comprising:
    a substrate defining a surface, the substrate comprising a melting point of less than or equal to 500° F.;
    a metallic layer provided as a pattern on the surface of the fabric or flexible composite material, wherein the metallic layer is an outermost layer of the fabric or flexible composite material, and wherein at least a portion of the substrate is not covered by the metallic layer, and wherein the pattern extends from a first edge of the substrate to a second edge of the substrate that is opposite the first edge; and
    an interior layer on a second surface of the substrate opposite the at least one surface, wherein the interior layer is an air-tight layer, wherein the fabric or flexible composite material comprises a fabric or flexible composite material weight less than 5 ounces/yd$^2$, and wherein the inflatable safety product comprises an inflatable evacuation slide, inflatable evacuation slide/raft, inflatable evacuation ramp, or inflatable evacuation slide/ramp.

15. An inflatable safety product comprising a fabric or flexible composite material, the fabric or flexible composite material comprising:
    a substrate defining a surface;
    a discontinuous metallic layer covering at least one surface of the substrate, the discontinuous metallic layer provided as a pattern on the substrate, and the pattern extending from a first edge of the substrate to a second edge of the substrate to cover an entire surface of the substrate;
    an exterior layer that covers the discontinuous metallic layer, wherein the exterior layer is an outermost layer of the fabric or flexible composite material; and
    an interior layer on a second surface of the substrate opposite the at least one surface, wherein the interior layer is an air-tight layer, wherein the inflatable safety product comprises an inflatable evacuation slide, inflatable evacuation slide/raft, inflatable evacuation ramp, or inflatable evacuation slide/ramp.

16. The inflatable safety product of claim 15, wherein the metallic layer is covered by the exterior layer to prevent damage, oxidation and/or corrosion of the metallic layer.

17. The inflatable safety product of claim 15, wherein the metallic layer is covered by the exterior layer to prevent deterioration of the fabric or flexible composite material due to hydrolysis.

18. The inflatable safety product of claim 15, wherein the metallic layer is covered by the exterior layer to promote adhesion to the metallic layer and/or to improve a durability of the metallic layer.

* * * * *